(12) United States Patent
Ennet et al.

(10) Patent No.: US 11,535,992 B2
(45) Date of Patent: Dec. 27, 2022

(54) THERMOPLASTIC PAVEMENT MARKING AND METHOD OF PRODUCING THE SAME

(71) Applicant: Colorpoint Osby Kemi AB, Osby (SE)

(72) Inventors: Peter Ennet, Osby (SE); Jonas Axelsson, Åkersberga (SE)

(73) Assignee: COLORPOINT OSBY KEMI AB, Osby (SE)

( * ) Notice: Subject to any disclaimer, the term of this patent is extended or adjusted under 35 U.S.C. 154(b) by 297 days.

(21) Appl. No.: 16/765,007

(22) PCT Filed: Nov. 20, 2018

(86) PCT No.: PCT/SE2018/051200
§ 371 (c)(1),
(2) Date: May 18, 2020

(87) PCT Pub. No.: WO2019/103683
PCT Pub. Date: May 31, 2019

(65) Prior Publication Data
US 2020/0283974 A1  Sep. 10, 2020

(30) Foreign Application Priority Data
Nov. 24, 2017 (SE) .................................. 1751449-8

(51) Int. Cl.
*B29C 65/08* (2006.01)
*E01F 9/512* (2016.01)
(Continued)

(52) U.S. Cl.
CPC .............. *E01F 9/512* (2016.02); *B29C 65/08* (2013.01); *B29C 66/1142* (2013.01);
(Continued)

(58) Field of Classification Search
CPC ..... B29C 65/08; B29C 66/1142; B29C 66/43; B29C 66/73921; E01F 9/512; B29L 2031/744
(Continued)

(56) References Cited

U.S. PATENT DOCUMENTS 6,749,704 B2 * 6/2004 Boussu ............... B29C 66/7392
156/64
2004/0105933 A1 6/2004 Wiley
(Continued)

FOREIGN PATENT DOCUMENTS

EP 3202554 A1 8/2017
WO 2016164055 A1 10/2016

OTHER PUBLICATIONS

European search report from related European application No. 18881503.9-1002 dated Jun. 9, 2021, all pages enclosed cited in its entirety.
(Continued)

*Primary Examiner* — James D Sells
(74) *Attorney, Agent, or Firm* — Burr & Forman LLP (57) ABSTRACT

A method of producing a preformed pavement marking prior to application to paving on the ground comprises: providing a first sheet (10a) of thermoplastic pavement marking material; providing a second sheet (10b) of thermoplastic pavement marking material; positioning the first and second sheets (10a, 10b) next to each other; transferring energy to an energization zone (28) along an edge of at least one of said first and second sheets (10a; 10b), to locally liquefy a portion of the thermoplastic material of said at least one of the first and second thermoplastic pavement marking material sheets (10a, 10b) in the energization zone (28); and
(Continued)

solidifying the liquefied thermoplastic of the energization zone (28) to form a bond between the first and second sheets (10*a*, 10*b*).

13 Claims, 6 Drawing Sheets

(51) Int. Cl.
  *B29C 65/00* (2006.01)
  *B29L 31/00* (2006.01)
(52) U.S. Cl.
  CPC ........ *B29C 66/43* (2013.01); *B29C 66/73921* (2013.01); *B29L 2031/744* (2013.01)
(58) Field of Classification Search
  USPC ..................................................... 428/195.1
  See application file for complete search history.

(56) References Cited

U.S. PATENT DOCUMENTS

| | | |
|---|---|---|
| 2011/0059295 A1 | 3/2011 | Greer et al. |
| 2011/0123769 A1 | 5/2011 | Greer |
| 2015/0056012 A1 | 2/2015 | Greer et al. |
| 2015/0330035 A1 | 11/2015 | Lamar |

OTHER PUBLICATIONS

International search report and written opinion from related international application No. PCT/SE2018/051200 dated Feb, 18, 2019, all pages enclosed cited in its entirety.

\* cited by examiner

THERMOPLASTIC PAVEMENT MARKING AND METHOD OF PRODUCING THE SAME

FIELD OF THE INVENTION

The present invention relates to a preformed thermoplastic pavement marking, and a method of producing such a pavement marking.

BACKGROUND OF THE INVENTION

Pavement markings are generally applied onto paved surfaces on the ground, such as onto roads, sidewalks, parking lots, schoolyards, and in other areas where there is a need for provide people with information or guidance. Typical pavement marking patterns may be, for example, guide lines, street signage, logos, game boards or pictograms. The paving typically consists of e.g. concrete or asphalt/tarmac. Sometimes, pavement markings are painted onto the paving using particular types of paint. Often, however, and in particular for more complex shapes, pavement markings may be preformed of a thermoplastic sheet material to a predetermined shape, and attached to the ground by e.g. heat or glue.

WO 2007/143988 discloses a brick and mortar pattern comprising a plurality of thermoplastic sections representing bricks, which are positioned in a grid representing a mortar pattern, and glued to the grid by means of a thermoplastic glue sprayed onto the back side of the pattern.

However, there is a need for a pavement marking that is easier to apply.

SUMMARY OF THE INVENTION

It is an object of the present invention to solve, or at least mitigate, parts or all of the above mentioned problems. To this end, there is provided a method of producing a preformed pavement marking prior to application to paving on the ground, the method comprising providing a first sheet of thermoplastic pavement marking material; providing a second sheet of thermoplastic pavement marking material; positioning the first and second sheets next to each other; transferring energy to an energization zone along an edge of at least one of said first and second sheets of thermoplastic pavement marking material, to locally liquefy a portion of the thermoplastic material of said at least one of the first and second thermoplastic pavement marking material sheets in the energization zone; and solidifying the liquefied thermoplastic of the energization zone to form a bond between the first and second sheets. By bonding the sheets directly to each other in this manner, a stronger and more rigid bond may be obtained, compared to spraying a thermoplastic glue onto the back side. This facilitates handling and proper alignment when positioning the pavement marking onto the ground, and allows forming more delicate and complex patterns. Moreover, the environmental impact may be reduced, since the need for heated thermoplastic glue for forming composite pavement markings is reduced. Typically, the energization zone is localized only to an interface region at said edge. Thereby, other parts of the first and second sheets may remain solid throughout the bonding process. A typical width of the energization zone perpendicular to said edge may, by way of example, be between 2 mm and 30 mm, and more typically, between 2 mm and 20 mm.

According to an embodiment, the energy may be transferred by means of mechanical energy transfer, such as by mechanical work, for example by mechanical vibration. Such a method allows bonding the sheets together at a high speed, and permits obtaining a high bond strength, in a limited energization zone in a reproducible manner. The mechanical energy transfer also sets the liquefied thermoplastic in motion, thereby inducing local intermixing of the materials of the sheets, which further strengthens the bond. By way of example, the energy may be transferred as ultrasonic vibrations, i.e. mechanical vibrations at a frequency exceeding 20 kHz.

According to an embodiment, said energization zone may be energized to liquefy the thermoplastic material to a liquefaction depth of at least 25% of a thickness of one of the first and second sheets. In some embodiments, the liquefaction depth may be at least 50% or at least 75% of said thickness. A liquefaction depth of less than 50% may enable folding the pavement marking along the bond to facilitate packaging and shipping, whereas a liquefaction depth of more than 50% results in an increased strength of the bond, allowing more rough handling of the pavement marking. A liquefaction depth of less than 100%, for example of less than 80%, of said thickness facilitates subsequent handling of the pavement marking, since no or only little time is required for allowing the pavement marking to cool off before it can be conveniently handled. A typical thickness of the sheets may be between 1 and 5 mm.

According to an embodiment, the method may further comprise, prior to joining the first and second sheets, placing them in non-overlapping abutment.

According to an embodiment, the thermoplastic materials of the first and second sheets may have substantially the same melting point. This provides for a particularly strong bond. Alternatively or additionally, in some embodiments, the first and second sheets may have different colours.

According to an embodiment, the method may further comprise, prior to joining the first and second sheets, cutting each of the first and second sheets to define, when positioned next to each other, at least a portion of a final shape of said preformed pavement marking. Thereby, a pavement marking of an arbitrary size may be conveniently produced in an environmentally friendly and efficient manner. The high bond strength obtainable by the method results in a robust pavement marking, allowing handling of large pavement markings without breaking them.

According to an embodiment, the method may further comprise, after joining the first and second sheets, cutting the composite sheet formed by the joined sheets to define at least a portion of a final shape of said preformed pavement marking. Thereby, smaller left-over portions of pavement marking material may be joined to form a larger, composite sheet, from which can be cut a larger continuous pavement marking than would be obtainable using any of the smaller, left-over portions. This allows reducing the material consumption in production of preformed pavement markings. Said at least a portion of a final shape of a pavement marking, which has been cut from the composite sheet, may, after cutting, be joined with other sheets of pavement marking material using the method described hereinabove. This may be repeated iteratively, to obtain arbitrary large preformed pavement markings using arbitrary small pieces of sheet material. Moreover, by joining sheets of different colours, the method allows forming patterned composite sheets which can be used for cutting multi-coloured pavement markings therefrom.

According to an embodiment, at least said first sheet may be configured as a roll of thermoplastic pavement marking material, and the method may be performed to attach said second sheet to a free end of said roll of thermoplastic pavement marking material, thereby allowing extending the length of the roll of thermoplastic pavement marking material. Thereby, rolls of pavement marking blank may be extended to an arbitrary length using discrete lengths of pavement marking blanks, which facilitates forming e.g. long strips for road lines.

According to an embodiment, the method may comprise bonding the sheets together at a plurality of separate positions along said edge of at least one of said thermoplastic pavement marking material sheets, to form an intermittent joint along an interface between the sheets. Such an intermittent joint may define a perforation for tearing off optional portions of the preformed pavement marking. Moreover, such bonding consumes comparatively less energy than bonding in an uninterrupted line along the entire interface between the sheets.

According to an embodiment, each of the pavement marking sheets may have a top face wear layer comprising embedded wear particles, such as glass beads. A bottom face of the sheets may be substantially free from such wear particles. This may provide for a stronger bond to the paving.

According to an embodiment, the energy transfer may be applied to a bottom face of the sheets. Thereby, any presence of non-thermoplastic particles, such as glass beads, in the top face will not decrease the strength of the bond. Moreover, the bond leaves comparatively little visual traces visible on the top face after attaching to the pavement. Alternatively or additionally, the energy transfer may be applied to a top face of the sheets.

According to an embodiment, the method may comprise applying a melt precursor, defined by a thermoplastic material having a lower melting point than a main body of said sheets of thermoplastic material, to a bottom face of at least one of said first and second sheets. Thereby, a stronger attachment to the paving may be obtained, with less impact on the visual appearance of the top face of the pavement marking after installation.

According to another aspect, there is provided a preformed thermoplastic pavement marking configured to be applied to paving on the ground, the pavement marking comprising a first pavement marking portion integrally formed of a first sheet of thermoplastic pavement marking material; a second pavement marking portion integrally formed of a second sheet of thermoplastic pavement marking material; and a bonding interface defined by an energization zone, in which the material of the first pavement marking portion has been integrally joined with the material of the second pavement marking portion. The pavement marking may have been obtained by the method as defined in any of the embodiments hereinabove.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF THE EXEMPLARY EMBODIMENTS

Figure 1:
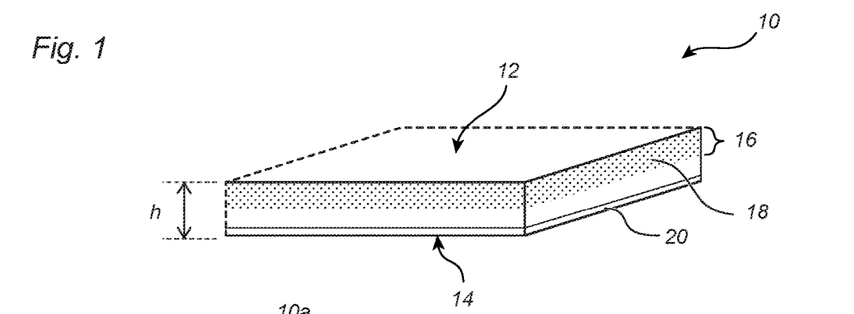
FIG. 1 is a diagrammatic view in section of a sheet of pavement marking material.

FIG. 1 illustrates a sheet 10 of thermoplastic material for pavement markings. Throughout this disclosure, the term "pavement" should be construed as a paved surface on the ground in general, and not so as to be limited to a sidewalk. The sheet 10 comprises a top face 12 and a bottom face 14. A top layer 16, which defines the top face 12, may comprise embedded glass beads 18 for increased retro-reflectivity and wear resistance. Glass beads may be present throughout the entire thickness of the thermoplastic sheet 10, in a top layer 16 only, or not at all. Also other inorganic fillers, which may be inert and/or have abrasive and/or anti-skid properties, may be present in the top layer 16. A typical amount of inorganic fillers may be about 50%-85% by weight, including the glass bead content. Organic/binder content may typically be about 15-50% by weight. An optional bottom layer 20 may consist of a thermoplastic material different from the material of the rest of the sheet. The thermoplastic material of the bottom layer 20 may have a somewhat lower melting point than the thermoplastic material of the top layer 16, and may act as a melting precursor when attaching the material to paving. It may also be free from glass beads. The bottom layer 20 may be applied to the bottom face of the main body of the thermoplastic pavement marking sheet 10 before or after cutting and/or joining the sheet 10 to preformed pavement markings. However, in some embodiments, it may be preferable to use a thermoplastic pavement marking sheet 10 without a different bottom layer 20, such as a thermoplastic pavement marking sheet 10 consisting only of the top layer 16. Such a sheet may have more controllable melting properties, provide a more predictable behaviour when bonding to paving on the ground, and/or provide stronger joints when joining following the methods disclosed herein. A typical thickness h of the sheet 10 may be between 1 mm and 5 mm, and more typically between 2 mm and 3.5 mm. The sheet 10 may be flexible, to allow rolling or folding of the material. By cutting the sheet 10 to various shapes, signage and road markings may be preformed or pre-cut at e.g. a factory site, and shipped to various sites for installation on paving on the ground. The sheet may be cut by e.g. waterjet cutting.

FIGS. 2A-D illustrate a non-additive method of joining a first sheet 10a of thermoplastic pavement marking material with a second sheet 10b of thermoplastic pavement marking material. Each of the first and second sheets 10a, 10b may be identical to the sheet 10 of FIG. 1. The method may be used for producing preformed pavement markings, as will be elucidated further below with reference to FIGS. 4A-C.

Figure 2A:
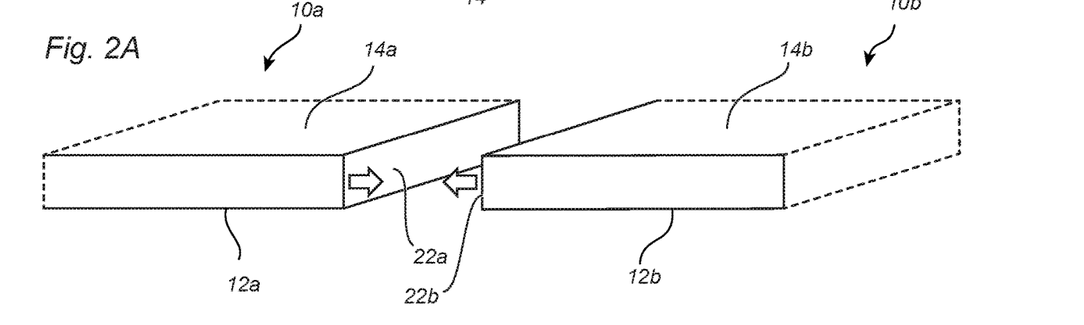
FIG. 2A is a schematic view in perspective of two sheets of pavement marking material, and illustrates a first intermediate stage of joining the sheets of pavement marking material together.

In a first step, illustrated in FIG. 2A, the first sheet 10a is positioned with its top face 12a down on a support surface (not illustrated). The second sheet 10b is positioned, also with its top face 12b down, next to the first sheet 10a. The second sheet 10b is positioned such that an edge 22b between the top and bottom faces 12b, 14b faces a similar edge 22a between the top and bottom faces 12a, 14a of the first sheet 10a.

Figure 2B:
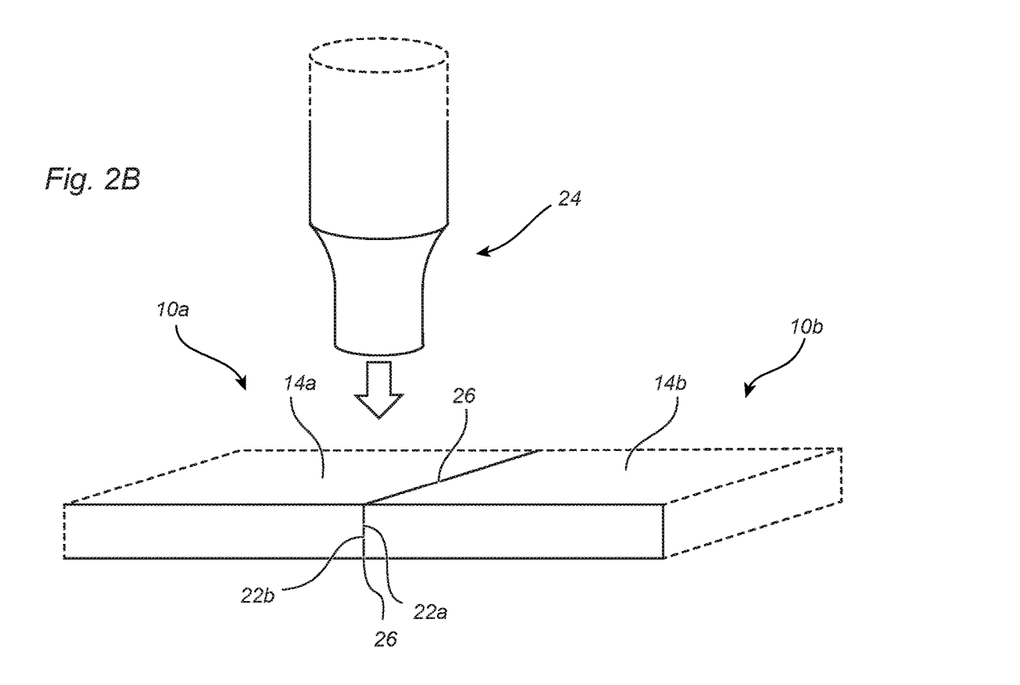
FIG. 2B is a schematic view in perspective of the two sheets of pavement marking material of FIG. 2A, and illustrates a second intermediate stage of joining the sheets of pavement marking material together.

In a second step, the first and second sheets 10a, 10b are moved towards each other along the arrows illustrated in FIG. 2A to the position of FIG. 2B, in which the sheets 10a, 10b non-overlappingly abut along their respective edges 22a, 22b. When in the position of FIG. 2B, a tool 24 is applied to the bottom faces 14a, 14b along the interface 26 between the edges 22a, 22b. The tool 24 is configured to transfer mechanical energy to the interface 26 in the manner illustrated in FIG. 2C. By applying mechanical energy, such as vibration, e.g. by means of an ultrasonic vibration device, to the thermoplastic material, friction forces will be generated causing heat generation and consequently melting of the thermoplastic material.

Figure 2C:
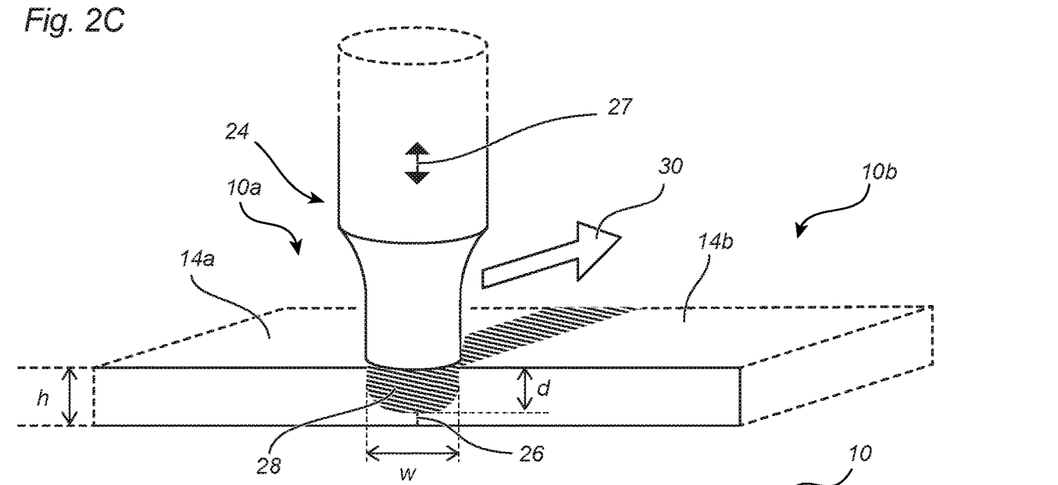
FIG. 2C is a schematic view in perspective of the two sheets of pavement marking material of FIGS. 2A-2B, and illustrates a third intermediate stage of joining the sheets of pavement marking material together.

FIG. 2C illustrates the tool 24, which may be a sonotrode configured to induce ultrasonic vibrations, when transferring energy to the interface 26 in a third step of the method. The tool 24 oscillates at an ultrasonic frequency, with its motion directed mainly along an oscillation axis perpendicular to the bottom faces 14a, 14b. The oscillation axis is illustrated by a double-headed arrow 27 in FIG. 2C. The energy is delivered by the tool 24 into an energization zone 28 (hatched) along the interface 26, in which energization zone 28 the thermoplastic material of the first and second sheets 10a, 10b is locally liquefied. A typical liquefaction depth d of the energization zone may be between 10% and 100% of the thickness h of the material, and a typical width w of the energization zone may be, for example, between 2 mm and 20 mm. The tool 24 is moved along the interface 26, in the direction indicated by an arrow 30, while kept in operation and in abutment with the bottom faces 14a, 14b. Thereby, the energization zone is moved along the arrow, to liquefy the thermoplastic material of the sheets 10a, 10b along the interface 26.

Figure 2D:
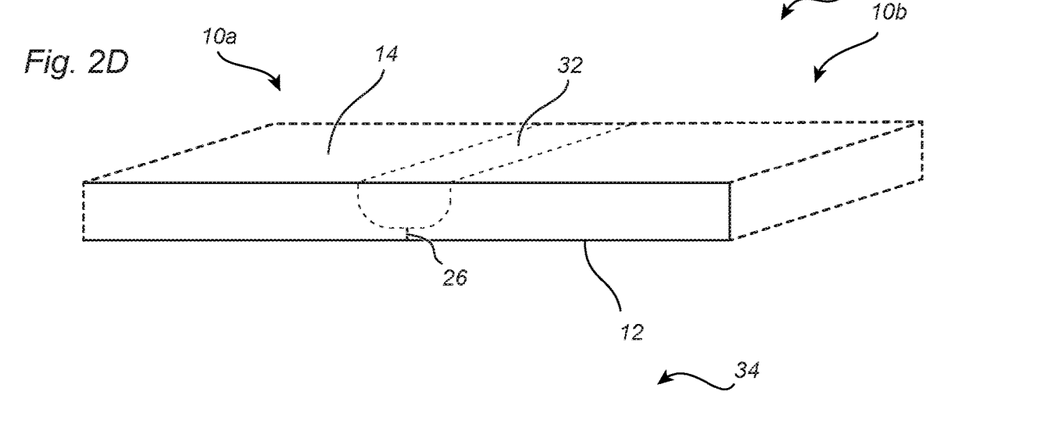
FIG. 2D is a schematic view in perspective of the two sheets of pavement marking material of FIGS. 2A-2C after having been joined together.

In a fourth step, illustrated in FIG. 2D, the energization zone is allowed to cool off, such that the liquefied thermoplastic material will solidify to form a bond between the first and second sheets, in which bond the first and second sheets 10a, 10b are integrally joined into a continuous composite sheet 10 of thermoplastic material. The solidified energization zone may typically leave a visual trace 32 on the bottom face 14 of the composite sheet 10 formed by the joined first and second sheets 10a, 10b. The interface 26 is still visible as a narrow slit on the top face 12, which defines a sharp visual border between the original sheets 10a, 10b on the top face 12. This may provide a better visual appearance of the resulting preformed pavement marking when joining sheets of different colours.

Figure 3:
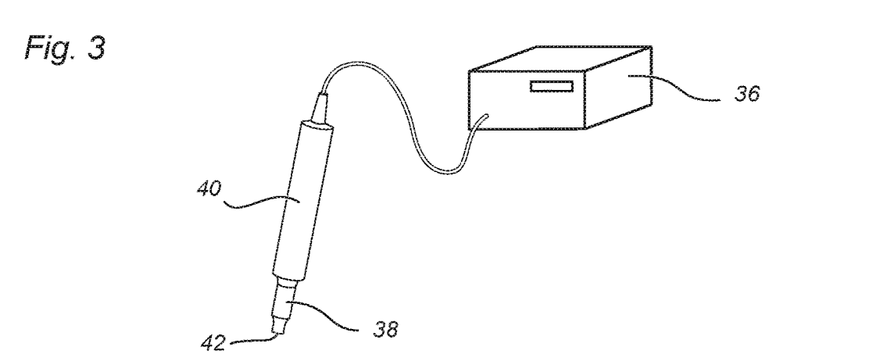
FIG. 3 is a schematic view in perspective of a tool system for joining sheets of pavement marking material together.

FIG. 3 illustrates an exemplary tool system 34 for generating and transferring mechanical vibration or oscillation suitable for the method described above. The system may typically comprise an electronic frequency generator 36 configured to generate an alternating current oscillating a frequency between 2 and 200 kHz; more typically between 10 and 100 kHz; and even more typically between 25 and 45 kHz. The system 34 further comprises a piezoelectric transducer configured as a sonotrode 38, which is connected to be powered by the alternating current supplied by the frequency generator 36. The sonotrode 38 is shaped to resonate at a frequency provided by the frequency generator 36, and may, by way of example, operate as a mechanical half-wavelength resonator in its longitudinal direction at an ultrasonic frequency of between 25 and 45 kHz. The system 34 may be configured to provide a mechanical vibration output power of between 50 W and 1 kW, and the active axial end surface 42 of the sonotrode 38 may be shaped to generate a power transfer in the engagement between the sonotrode 38 and the energization zone 28 of the sheets 10a, 10b to be joined (FIG. 2C) of between 0.5 and 20 W per square millimetre of active surface of the sonotrode 38. The sonotrode 38 may be designed such that its interface with the energization zone 28 oscillates predominantly along an oscillation axis substantially perpendicular to the sheets 10a, 10b of pavement marking material, and with an amplitude of between 1 and 100 μm, such as around 10 to 60 μm. A handle 40 facilitates manual operation of the sonotrode 38, e.g. for moving the sonotrode 38 along the interface 26 (FIG. 2B) to be joined.

FIGS. 4A-4E illustrate an exemplary manufacture and installation of a preformed thermoplastic pavement marking. Starting with FIG. 4A, a first piece of thermoplastic pavement marking material of a first colour is cut to define a first portion 110a and a second portion 210a of a final shape of a preformed pavement marking. A second piece of thermoplastic pavement marking material of a second colour, different from said first colour, is cut to define a third portion 110b and a fourth portion 210b of the final shape of said preformed pavement marking. Each of the portions 110a, 110b, 210a, 210b has a contour that defines the contour of at least a portion of the pavement marking, such as the contour of an outer edge or the contour of a pattern of the pavement marking to be produced. As illustrated by arrows, the first portion 110a is positioned in non-overlapping abutment with the second portion 110b, and the third portion 210a is positioned in non-overlapping abutment with the fourth portion 210b, to arrive at the position illustrated in FIG. 4B.

Figure 4A:
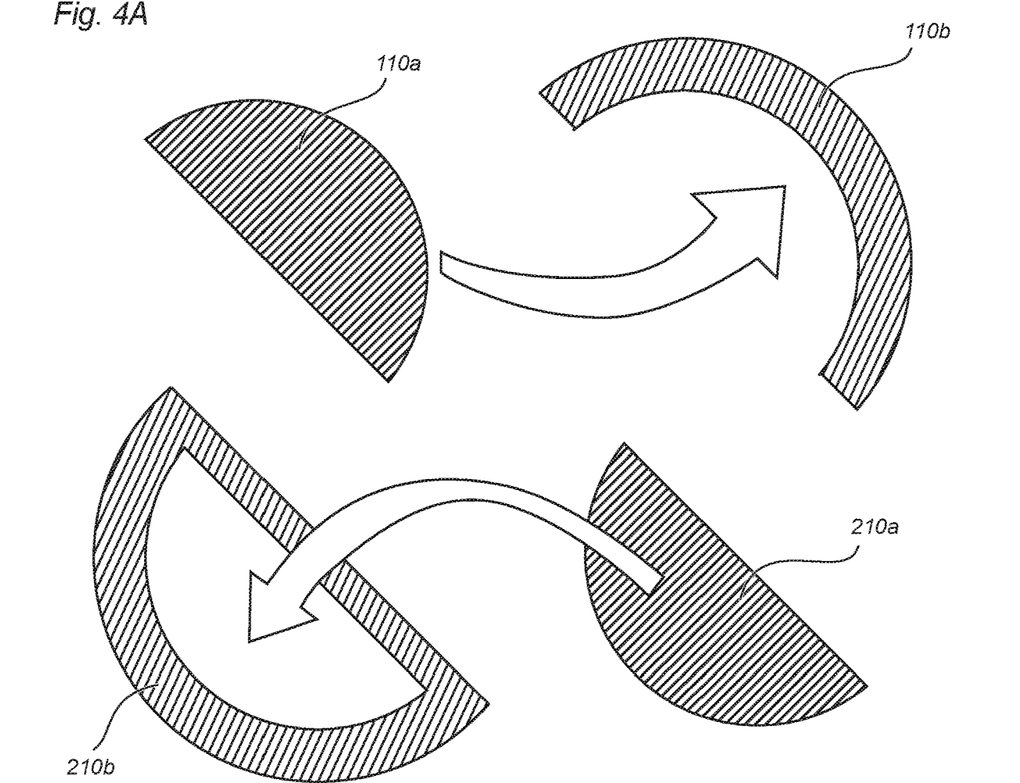
FIG. 4A is a schematic view of four different portions of a preformed pavement marking as seen from above, prior to joining.
Figure 4B:
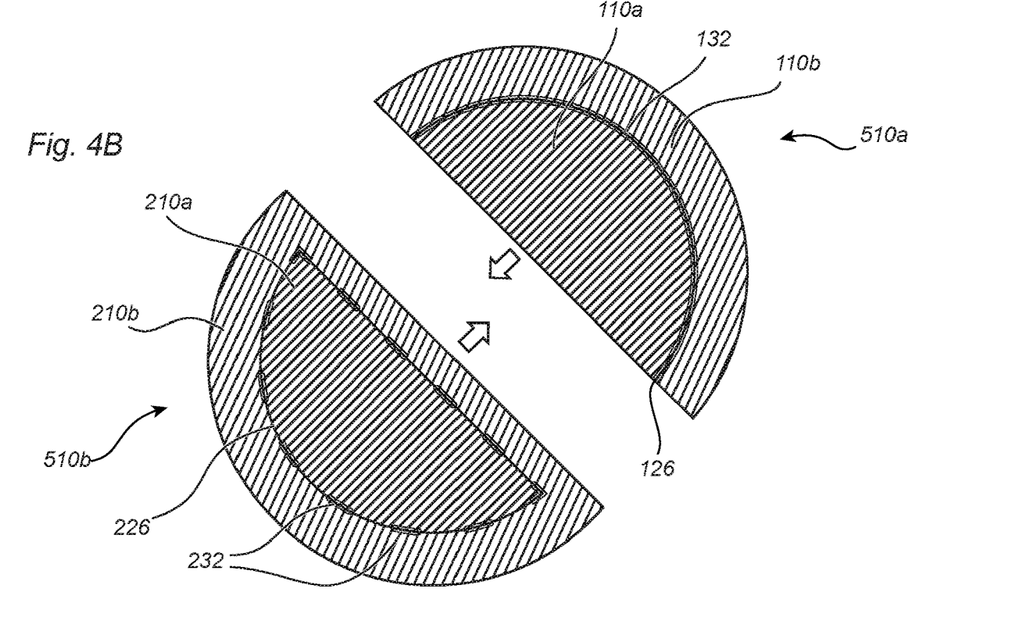
FIG. 4B is a schematic view of the pavement marking portions of FIG. 4A at an intermediate stage of joining.

When in the position of FIG. 4B, the first portion 110a is joined with the second portion 110b along an interface 126, following the method described hereinabove with reference to FIGS. 2A-2D, to define a first composite portion 510a of the final shape of said preformed pavement marking. The entire length of the interface 126 may be energized from above and/or below to form a continuous joint 132a. Similarly, the third portion 210a is joined with the fourth portion 210b along an interface 226, following the method described hereinabove with reference to FIGS. 2A-2D, to define a second composite portion 510b of the final shape of said preformed pavement marking. The interface 226 may be energized from above and/or below at intermittent positions along its length, to form an intermittent joint 232.

Figure 4C:
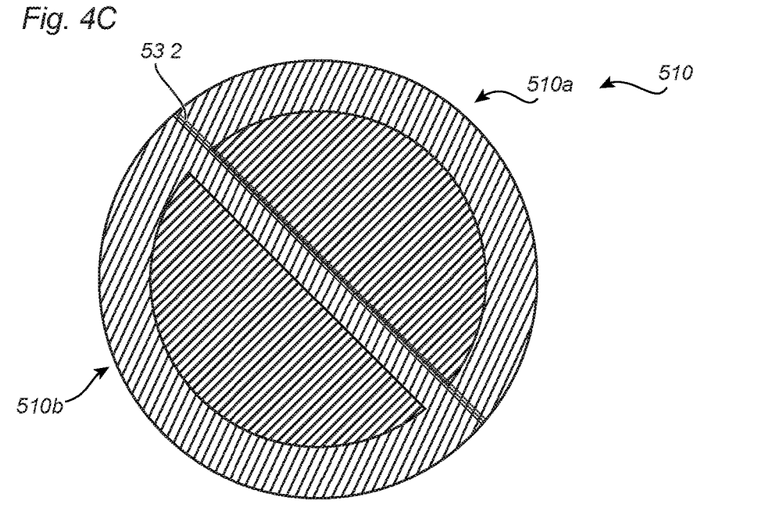
FIG. 4C is a schematic view of the pavement marking portions of FIGS. 4A-4B after joining.

After having manufactured the composite portions 510a, 510b of the preformed thermoplastic pavement marking, the pavement marking may be ready for shipping from the factory to the installation site. Alternatively, also the composite portions 510a, 510b may be joined together, following the method described hereinabove with reference to FIGS. 2A-2D, prior to shipping, to define the entire shape of the preformed pavement marking 510 as a single, integrally joined sheet, as illustrated in FIG. 4C. The composite portions 510a, 510b may be joined along a joint 532.

Figure 4D:
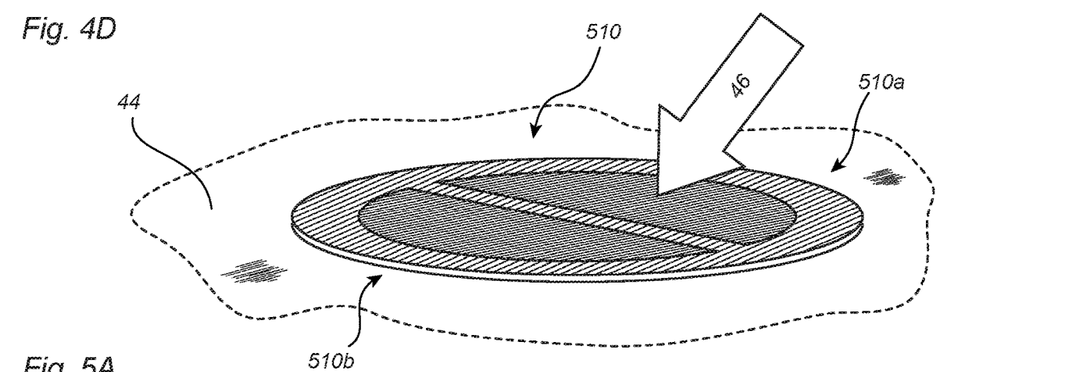
FIG. 4D is a schematic view in perspective of joined pavement marking of FIG. 4C during installation on the ground.

At the installation site, the preformed pavement marking 510 is positioned at its intended installation position on the paving 44, either as a single integral piece 510 (FIG. 4C) or as two separate pieces 510a, 510b (FIG. 4B) in non-overlapping abutment, in the manner illustrated in FIG. 4D. The installation is finalized by applying heat from above, typically using a propane torch, as illustrated by an arrow 46. The heat at least partly liquefies the thermoplastic material of the pavement marking 510 such that the marking 510 melts into and engages with the surface structure of the paving 44. After cooling and re-solidifying, the pavement marking 510 forms a strong bond with the material of the paving 44. If the two composite portions 510a, 510b were not joined prior to positioning on the paving, the applied heat 46 will join them together at the same time as they are bonded to the paving 44.

Figure 5A:
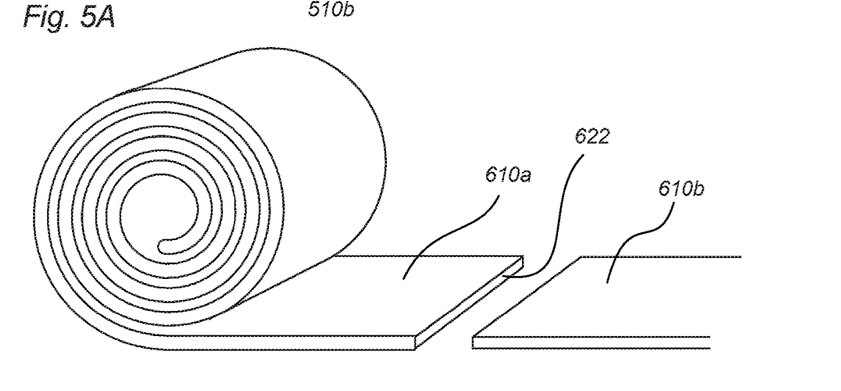
FIG. 5A is a schematic view in perspective of a roll of thermoplastic pavement marking material and a sheet of thermoplastic pavement marking material prior to joining.
Figure 5B:
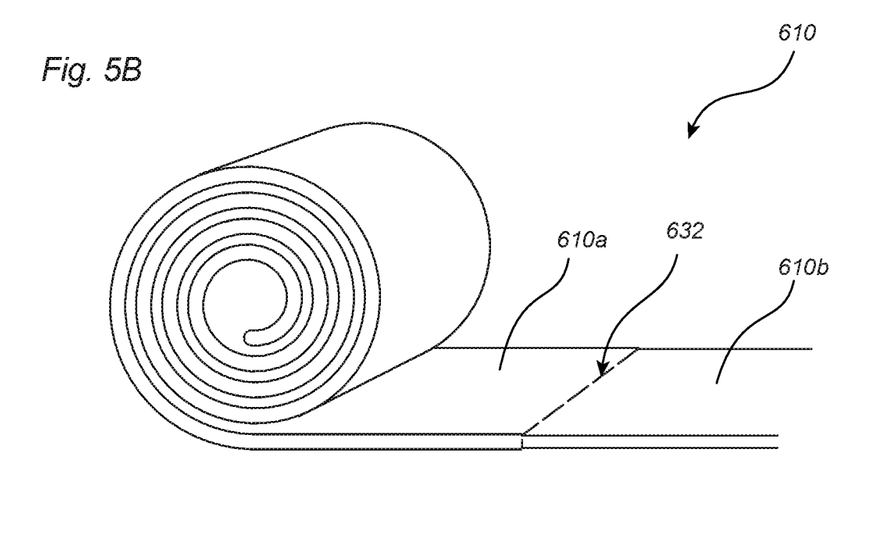
FIG. 5B is a schematic view in perspective of the roll and sheet of thermoplastic pavement marking material of FIG. 5A after joining.

Turning now to FIG. 5A, the method described hereinabove with reference to FIGS. 2A-2D may be iterated for extending the length of a piece thermoplastic material to an arbitrary length, for example by providing a roll of thermoplastic pavement marking material sheet 610a, and joining a second sheet 610b of thermoplastic pavement marking material to a free end 622 of said roll of thermoplastic pavement marking material 610a using said method, to form an extended roll of thermoplastic material sheet 610 as illustrated in FIG. 5B. The pieces 610a, 610b may be bonded together along an intermittent joint 632, which may be used as a tear indication for tearing off discrete pieces of pavement marking material from the roll 610 at the installation site. This may facilitate e.g. tearing off various lengths of road marking strip without the need for cutting tools. By energizing the joint to a comparatively low liquefaction depth d (FIG. 2C), leaving a substantial portion of the material thickness at the joint unbonded, tearing will be further facilitated. The composite roll of pavement marking material sheet 610 thus formed may also be used for cutting other pavement marking shapes, unrestricted by the tear indications. Tear indications may also be formed in any other suitable manner, such as by cutting perforations or indents along intended tear lines in the sheet of pavement marking material.

Figure 6:
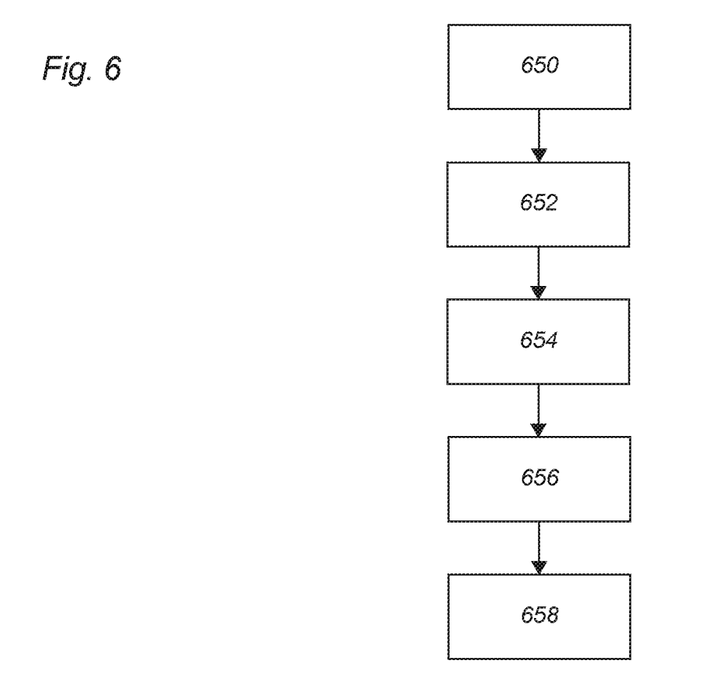
FIG. 6 is a flow chart illustrating a method of producing a preformed thermoplastic pavement marking.

FIG. 6 illustrates the method of FIGS. 2A-2D in a flow chart. In step, 650, a first sheet of thermoplastic pavement marking material 10a (FIG. 2A) is provided. In step 652, a second sheet of thermoplastic pavement marking material 10b (FIG. 2A) is provided. In step 654, the first and second sheets 10a, 10b are positioned next to each other. In step 656, energy is transferred to an energization zone 28 (FIG. 2C) along an edge 22a of at least one of said first and second sheets 10a, 10b, to locally liquefy a portion of the thermoplastic material the first and second sheets 10a, 10b in the energization zone 28. In step 658, the liquefied thermoplastic of the energization zone 28 is solidified to form a bond 32 (FIG. 2D) between the first and second sheets 10a, 10b.

Figures 7A, 7B:
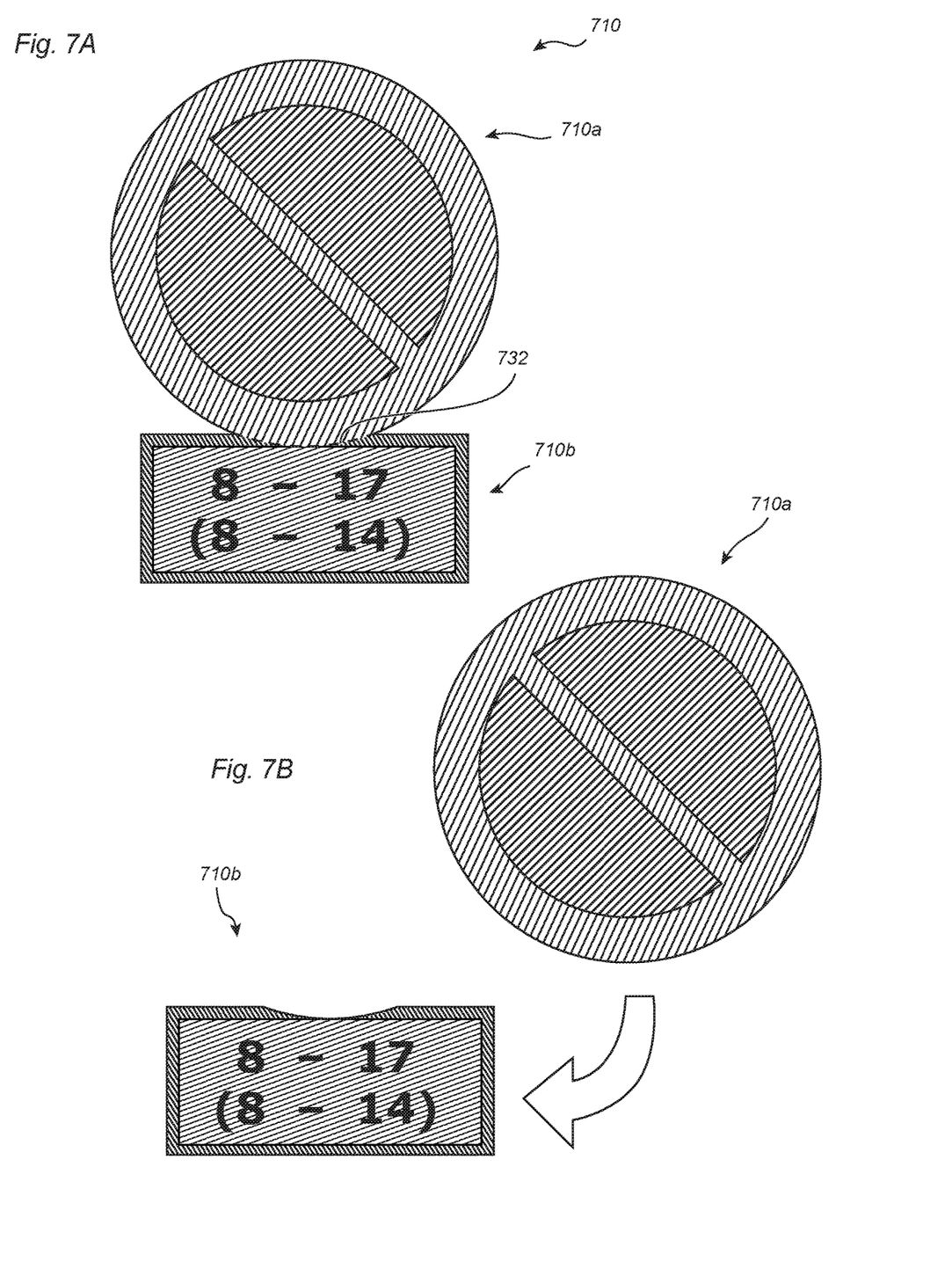
FIG. 7A is a schematic view of a preformed thermoplastic pavement marking provided with a tear indication, as seen from above, prior to tearing off an optional portion.
FIG. 7B is a schematic view of the preformed pavement marking of FIG. 7A, after tearing off the optional portion.

FIG. 7A illustrates a thermoplastic pavement marking 710 comprising a main portion 710a and an optional portion 710b, which are connected along an interface 732 defining a tear indication. In the present example, the main portion 710a indicates a prohibition to park, and the optional portion 710b indicates the times during which the parking prohibition applies. Thereby, the need for keeping all variations of pavement markings in stock is reduced. The tear indication 732 may be shaped to have a lower mechanical strength than the body of each of the main and optional portions 710a, 710b, such that pulling the main and optional portions 710a, 710b apart results in breaking up the pavement marking 710 along the tear indication 732. The tear indication 732 may be formed by intermittently joining the main and optional portions 710a, 710b, following e.g. any of the methods described hereinabove, or by joining them along a continuous joint to a limited liquefaction depth. Alternatively, the tear indication may be formed by cutting or perforating the pavement marking along an intended tear line. If there is a need for indicating a general parking prohibition, the optional portion 710b may be torn off, in the manner indicated in FIG. 7B, prior to installation of the main portion 710a onto the paving. The torn off optional portion 710b may be discarded, re-cycled, or used elsewhere in combination with other pavement markings.

A thermoplastic material suitable for pavement markings described hereinabove may comprises a polymeric phase (especially C, P, S or Si chain based) that transforms from solid into liquid or flowable at a temperature above a critical temperature range, for example by melting, and retransforms into a solid material when again cooled below the critical temperature range, for example by crystallization, whereby the viscosity of the solid phase may be more than an order of magnitude higher than that of the liquid phase. The thermoplastic material may generally comprise a polymeric component that is not cross-linked covalently or that is cross-linked in a manner that the cross-linking bonds open reversibly upon heating to or above a melting temperature range. The polymer material may further comprise a filler, e.g. fibres or particles of a material which has no thermoplastic properties or has thermoplastic properties including a melting temperature range which is considerably higher than the melting temperature range of the basic polymer, such as glass beads for retro-reflectivity and increased wear resistance. Examples of thermoplastic materials for pavement markings are thermoplastic polymers, co-polymers, functional polymers and/or filled polymers, wherein the basic polymer or co-polymer is e.g. polyethylene, polypropylene, polyamide resin, hydrocarbon resin, maleic modified resin, alkyd resin, EVA (ethylene vinyl acetate) and/or styrene-isoprene-styrene elastomer, waxes, vegetable oils, etc.

The invention has mainly been described above with reference to a few embodiments. However, as is readily appreciated by a person skilled in the art, other embodiments than the ones disclosed above are equally possible within the scope of the invention, as defined by the appended patent claims. For example, there are many ways of transferring energy to the energization zone, and the present invention is not limited to those ways described in detail hereinabove.

According to another inventive concept, which may become the subject of a divisional application, there is provided a thermoplastic pavement marking configured to be applied to paving on the ground, the pavement marking comprising
 a first pavement marking portion; and
 a second pavement marking portion, wherein the first and second portions are integrally joined along an interface where an edge of the first pavement marking portion adjoins an edge of the second pavement marking portion, wherein the interface comprises a tear indication, which allows tearing said first and second portions apart along the tear indication. According to embodiments, the tear indication may comprise a perforation and/or a slit extending along the interface to define an intended tear line. The pavement marking may be a composite pavement marking formed by integrally joining the first and second portions together along the interface, for example by using any of the methods described hereinbefore. Alternatively or additionally, tear indications may be formed by e.g. cutting intermittent perforations or continuous incisions.

The invention claimed is:

1. A method of producing a preformed pavement marking prior to application to paving on the ground, the method comprising:
 providing a first sheet of thermoplastic pavement marking material;
 providing a second sheet of thermoplastic pavement marking material;
 positioning the first and second sheets next to each other;
 transferring energy to an energization zone along an edge of at least one of said first and second sheets of thermoplastic pavement marking material, to locally liquefy a portion of thermoplastic material of said at least one of the first and second thermoplastic pavement marking material sheets in the energization zone; and
 solidifying the liquefied thermoplastic of the energization zone to form a bond between the first and second sheets, wherein the energy is transferred by means of mechanical energy transfer.

2. The method according to claim 1, wherein said energization zone is energized to liquefy the thermoplastic material to a liquefaction depth of at least 25% of a thickness of one of the first and second sheets.

3. The method according to claim 1, further comprising:
 prior to joining the first and second sheets, placing them in non-overlapping abutment.

4. The method according to claim 1, wherein the thermoplastic materials of the first and second sheets have substantially the same melting point.

5. The method according to claim 1, further comprising prior to joining the first and second sheets, cutting each of the first and second sheets to define, when positioned next to each other, at least a portion of a final shape of said preformed pavement marking.

6. The method according to claim 1, further comprising after joining the first and second sheets, cutting the composite sheet formed by the joined sheets to define at least a portion of a final shape of said preformed pavement marking.

7. The method according to claim 1, wherein at least said first sheet is configured as a roll of thermoplastic pavement marking material, and the method is performed to attach said second sheet to a free end of said roll of thermoplastic pavement marking material, thereby allowing extending the length of the roll of thermoplastic pavement marking material.

8. The method according to claim 1, comprising bonding the sheets together at a plurality of separate positions along said edge of at least one of said thermoplastic pavement marking material sheets, to form an intermittent joint along an interface between the sheets.

9. The method according to claim 1, wherein each of the pavement marking sheets has a top face wear layer comprising embedded wear particles.

10. The method according to claim 1, wherein the energy transfer is applied to a bottom face of the sheets.

11. The method according to claim 1, comprising applying a melt precursor, defined by a thermoplastic material having a lower melting point than a main body of said sheets of thermoplastic material, to a bottom face of at least one of said first and second sheets.

12. A preformed thermoplastic pavement marking configured to be applied to paving on the ground, the pavement marking comprising:
 a first pavement marking portion integrally formed of a first sheet of thermoplastic pavement marking material;
 a second pavement marking portion integrally formed of a second sheet of thermoplastic pavement marking material; and
 a bonding interface defined by an energization zone, in which the material of the first pavement marking portion has been integrally joined with the material of the second pavement marking portion by means of mechanical energy transfer to the energization zone;
 wherein the energization zone is disposed along an edge of at least one of said first pavement marking portion and said second pavement marking portion.

13. A preformed thermoplastic pavement marking, configured to be applied to paving on the ground, responsive to:
 providing the first sheet of thermoplastic pavement marking material;
 providing the second sheet of thermoplastic pavement marking material;
 positioning the first and second sheets next to each other;
 transferring energy to an energization zone along an edge of at least one of said first and second sheets of thermoplastic pavement marking material, to locally liquefy a portion of thermoplastic material of said at least one of the first and second thermoplastic pavement marking material sheets in the energization zone; and
 solidifying the liquefied thermoplastic of the energization zone to form a bond between the first and second sheets, wherein the energy is transferred by means of mechanical energy transfer.

* * * * *